(12) United States Patent
Choi et al.

(10) Patent No.: US 7,362,975 B2
(45) Date of Patent: Apr. 22, 2008

(54) BANDWIDTH ALLOCATION DEVICE AND DYNAMIC BANDWIDTH ALLOCATION METHOD BASED ON CLASS OF SERVICE IN ETHERNET PASSIVE OPTICAL NETWORK

(75) Inventors: Su Il Choi, Daejeon (KR); Jae Doo Huh, Daejeon (KR); Hyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 696 days.

(21) Appl. No.: 10/606,529

(22) Filed: Jun. 26, 2003

(65) Prior Publication Data

US 2004/0146301 A1    Jul. 29, 2004

(30) Foreign Application Priority Data

Dec. 2, 2002  (KR) ............... 10-2002-0075872

(51) Int. Cl.
    *H04B 10/20* (2006.01)
(52) U.S. Cl. ..................... 398/58; 398/63; 398/71
(58) Field of Classification Search ............ 398/58, 398/63, 70, 71, 72
    See application file for complete search history.

(56) References Cited

U.S. PATENT DOCUMENTS 5,796,732 A * 8/1998 Mazzola et al. ............ 370/362
6,023,467 A * 2/2000 Abdelhamid et al. ..... 370/236.2
6,275,502 B1 * 8/2001 Arimilli ..................... 370/468
2005/0249497 A1 * 11/2005 Haran et al. ................ 398/58

OTHER PUBLICATIONS

Phototonic Network Communications, 3:3, 307-319, 2001, "Ethernet PON (ePON): Design and Analysis of an Optical Access Network", G. Kramer, et al.
ETRI Journal, "Dynamic Bandwidth Allocation Algorithm for Multimedia Services over Ethernet PONs", S. Choi, et al, 2 pages.
Phototonic Network Communications, 4:1, 89-107, 2002, "Interleaved Polling with Adaptive Cycle Time (IPACT): A Dynamic Bandwidth Distribution Scheme in an Optical Access Network", G. Kramer.

* cited by examiner

*Primary Examiner*—Christina Leung
(74) *Attorney, Agent, or Firm*—Blakely, Sokoloff, Taylor & Zafman LLP

(57) ABSTRACT

A bandwidth allocation device and a dynamic bandwidth allocation method are provided for differentiated classes of service in an Ethernet Passive Optical Network (EPON), which includes an optical line termination (OLT), an optical distribution network (ODN), and a plurality of optical network units (ONUs). The OLT includes a Multi-Point Control Protocol (MPCP) allocator, which includes a class-based queue state counter and a grant generator. The ONU includes an MPCP requester, which includes a class-based buffer counter and a request generator. The device and the method enable efficient utilization of network resources using class-based grant allocation.

4 Claims, 5 Drawing Sheets

BANDWIDTH ALLOCATION DEVICE AND DYNAMIC BANDWIDTH ALLOCATION METHOD BASED ON CLASS OF SERVICE IN ETHERNET PASSIVE OPTICAL NETWORK

BACKGROUND OF THE INVENTION

1. Field of the Invention

The present invention relates to a bandwidth allocation device and a dynamic bandwidth allocation method based on CoS (class of service) in an Ethernet Passive Optical Network (EPON), and more particularly to a bandwidth allocation device and dynamic bandwidth allocation method based on class of service which enable both the efficient utilization of network resources and the provision of various services in an Ethernet-based passive optical network.

2. Description of the Related Art

Generally, a passive optical network (PON) has a configuration such that a passive optical distribution network (ODN) or a wavelength division multiplex element is used between FTTH (Fiber To The Home) or FTTC (Fiber To The Curb/Cabinet)-subscriber access node and optical network terminations (ONTs), and has a topology such that all nodes are distributed in a bus or tree structure.

For access to an optical subscriber network, the PON system includes, as shown in FIG. 1, optical network units (ONUs) 103 installed inside a place such as a home or office, and optical line terminations (OLTs) 101 installed at a telephone office and connected to each of ONUs 103 through an optical cable. Each of the OLTs 101 enables the provision of various services such as Internet, telephone, and interactive video.

Because users can share exchange equipment and optical resources, and the optical distribution network is passive, such a PON scheme has advantages in that maintenance fees are low, a provider can easily add or drop a split, increasing the flexibility, and the cost per user are lowered due to a high degree of sharedness of the network resources.

However, because a number of users share the optical resources, the PON has a problem of collisions between the users. Thus, it is necessary to provide a dynamic bandwidth allocation algorithm (DBA) which enables transmission of information with no collision between users, and which also enables efficient utilization of the network resources.

Recently, an Ethernet-based PON system is gathering attention as means to implement economically a network suitable for providing a wideband services. In the Ethernet-based PON system, it is necessary to provide a medium access control (MAC) protocol for efficiently managing an upstream traffic multiplexing. The IEEE802.3ah EFM (Ethernet First Mile) standardization consortium has proposed an MPCP (Multi-Point Control Protocol). The dynamic bandwidth allocation algorithm does not belong to this standardization field. Thus, it is necessary to propose a control message having a new format according to the MPCP protocol for achieving an efficient upstream bandwidth allocation scheme in consideration of QoS (Quality of Service).

SUMMARY OF THE INVENTION

Therefore, the present invention has been made in view of the above necessity, and it is an object of the present invention to provide a bandwidth allocation device and a dynamic bandwidth allocation method wherein an Ethernet frame is used for upstream/downstream transmission between an OLT and ONUs, the amount of bandwidth requested by the ONUs is reserved in advance based on class of service using an upstream frame, and, as a grant operation in response to these requests, a bandwidth allocation is dynamically performed for securing the quality of each service.

In accordance with one aspect of the present invention, the above and other objects can be accomplished by the provision of a bandwidth allocation device for an Ethernet Passive Optical Network (EPON) including an optical line termination (OLT), an optical distribution network (ODN), and a plurality of optical network units (ONUs), wherein the optical line termination includes a Multi-Point Control Protocol (MPCP) allocator, and the optical network unit includes an MPCP requester, said MPCP allocator including:

a class-based queue state counter which differentiates the optical network unit, upon receipt of a control message for upstream report (REPORT) from a Medium Access Control (MAC) control layer, and obtains class-based queue length information of the optical network unit; and a grant generator which, when queue state information of all the optical network units is obtained through the class-based queue state counter, generates a service-based bandwidth for each of the optical network units, and transmits a downstream bandwidth allocation control message (GATE), said MPCP requester including:

a class-based buffer counter which counts a class-based buffer length, upon receipt of the downstream bandwidth allocation control message from the grant generator; and a request generator which generates class-based buffer length information, and transmits the control message for upstream report containing the generated buffer length information.

In accordance with another aspect of the present invention, there is provided a dynamic bandwidth allocation method for an Ethernet Passive Optical Network (EPON) including an optical line termination (OLT), an optical distribution network (ODN), and a plurality of optical network units (ONUs), the method comprising:

a first step of, upon receipt of a control message for upstream report from the optical network unit, checking which ONU's information is contained in the received control message, and updating a bandwidth;

a second step of, when a sum of bandwidths for HP (High Priority) of all ONUs is more than a link capacity, allocating a bandwidth proportional to the bandwidth for HP of each of the ONUs to each of the ONUs in the same order as a previously allocated order of ONUs, if there is a previously allocated order of ONUs;

a third step of, when the sum of bandwidths for HP (High Priority) of all ONUs is less than the link capacity, allocating a bandwidth equal to the bandwidth for HP to each of the ONUs;

a fourth step of, when a sum of the bandwidths for HP and MP (Medium Priority) of all ONUs is more than the link capacity, using a bandwidth remaining after the allocation for the bandwidths for HP to additionally allocate a bandwidth proportional to the bandwidth for MP of each of the ONUs to each of the ONUs;

a fifth step of, when the sum of the bandwidths for HP and MP of all ONUs is less than the link capacity, using a bandwidth remaining after the allocation for the bandwidths for HP to additionally allocate a bandwidth equal to the bandwidth for MP of each of the ONUs to each of the ONUs;

a sixth step of, when a sum of maximum bandwidths of all ONUs is more than the link capacity, using a bandwidth remaining after the allocation for the bandwidths for HP and MP to additionally allocate a bandwidth proportional to the bandwidth for LP (Low Priority) of each of the ONUs to each of the ONUs; and a seventh step of, when the sum of the maximum bandwidths is less than the link capacity, allocating an additional bandwidth to each of the ONUs so that a total bandwidth allocated to each of the ONUs is equal to the maximum bandwidth of each of the ONUs, and equally dividing a bandwidth remaining after the bandwidth allocation for the maximum bandwidth to be additionally allocated as a bandwidth for LP to each of the ONUs.

In accordance with yet another aspect of the present invention, there is provided a computer-readable recording medium enabling a computer to performs:

a first step of, upon receipt of a control message for upstream report, checking which ONU's information is contained in the received control message, and updating a bandwidth;

a second step of, when a sum of bandwidths for HP of all ONUs is more than a link capacity, allocating a bandwidth proportional to the bandwidth for HP of each of the ONUs to each of the ONUs in the same order as a previously allocated order of ONUs, if there is a previously allocated order of ONUs;

a third step of, when the sum of bandwidths for HP of all ONUs is less than the link capacity, allocating a bandwidth equal to the bandwidth for HP to each of the ONUs;

a fourth step of, when a sum of the bandwidths for HP and MP of all ONUs is more than the link capacity, using a bandwidth remaining after the allocation for the bandwidths for HP to additionally allocate a bandwidth proportional to the bandwidth for MP of each of the ONUs to each of the ONUs;

a fifth step of, when the sum of the bandwidths for HP and MP of all ONUs is less than the link capacity, using a bandwidth remaining after the allocation for the bandwidths for HP to additionally allocate a bandwidth equal to the bandwidth for MP of each of the ONUs to each of the ONUs;

a sixth step of, when a sum of maximum bandwidths of all ONUs is more than the link capacity, using a bandwidth remaining after the allocation for the bandwidths for HP and MP to additionally allocate a bandwidth proportional to the bandwidth for LP of each of the ONUs to each of the ONUs; and a seventh step of, when the sum of the maximum bandwidths is less than the link capacity, allocating an additional bandwidth to each of the ONUs so that a total bandwidth allocated to each of the ONUs is equal to the maximum bandwidth of each of the ONUs, and equally dividing a bandwidth remaining after the bandwidth allocation for the maximum bandwidth to be additionally allocated as a bandwidth for LP to each of the ONUs.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
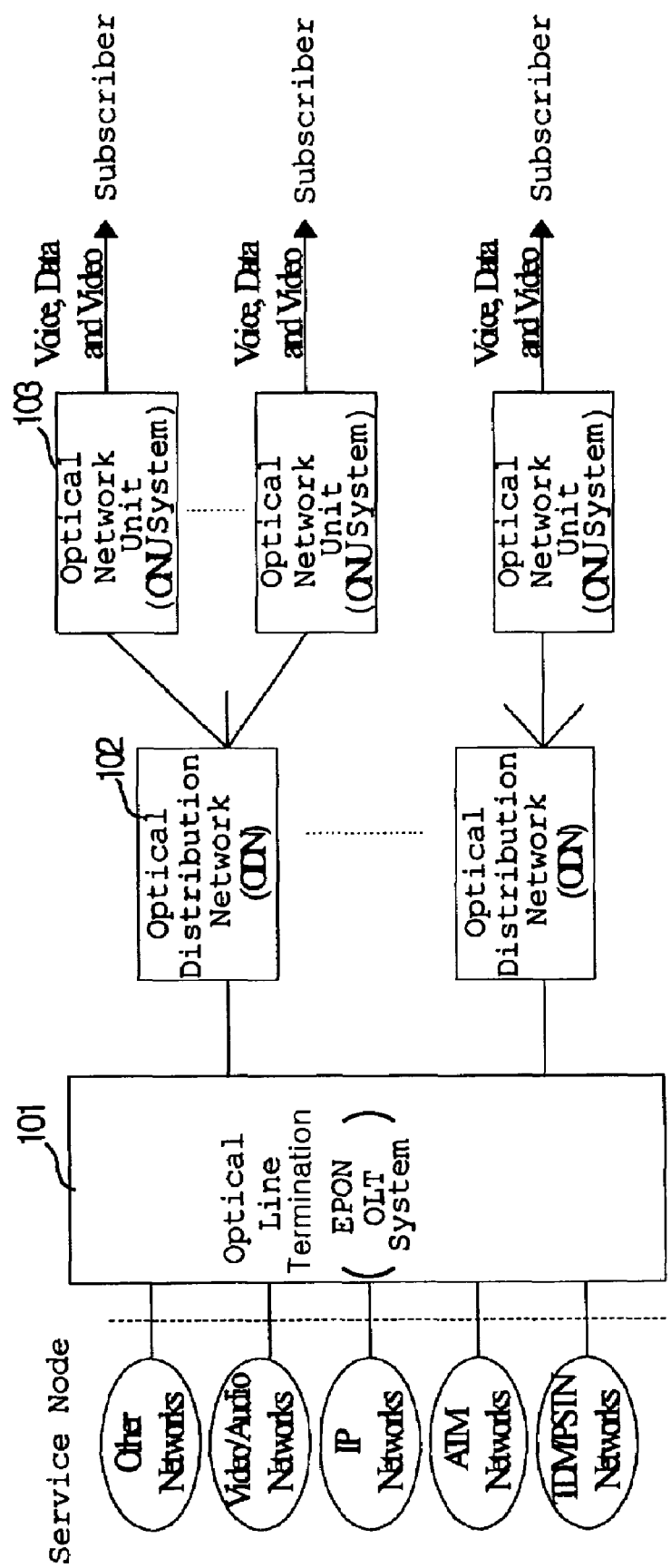
FIG. 1 is a view showing the configuration of a general Ethernet access network system.

According to the present invention, an optical transmission protocol scheme between subscribers and a telephone office in an Ethernet Passive Optical Network (EPON) classifies services into high priority, medium priority, and low priority services. The high priority service is defined as a service having requirements of end-to-end delay and jitter. The medium priority service is defined as a service which is not sensitive to the delay but requires a specific bandwidth. The low priority service is defined as a BETC (Best Effort Traffic Class) service with no requirement of end-to-end delay and jitter, which is assigned a marginal bandwidth. A maximum bandwidth is defined as the total amount of bandwidths set to the corresponding ONU, i.e., a sum of bandwidths allocated to each of the classified services.

Upstream bandwidths are allocated to the classified services in the priority order to provide each of QoS-guaranteed services.

Now, embodiments of the present invention will be described in detail referring to the drawings.

FIG. 1 is a view showing the configuration of an Ethernet access network having a PON structure to which the present invention is applied. A PON system is positioned at the root of a tree structure, and includes an OLT (Optical Line Termination) system 101, an ONU (Optical Network Unit) system 103, and an ODN (Optical Distribution Network) 102. The OLT system 101 performs an important function in providing information to each subscriber in the access network. The ONU (Optical Network Unit) system 103 permits a number of users to gain access to the OLT system 101. The ODN (Optical Distribution Network) 102 has a structure of tree topology and provides a connection between the OLT system 101 and the ONU system 103. The OLT system 101 performs a bandwidth allocation algorithm in consideration of various Ethernet traffics.

The operation of a protocol implemented in the Ethernet access network according to the present invention is briefly described as follows. When a bandwidth for each of services is reserved based on the class of service through an upstream report control message, grant information generated through a CoS (Class of Service)-based bandwidth allocation algorithm is transmitted to a corresponding ONU through a control message for downstream bandwidth allocation. Upon receipt of the grant information, the granted ONU transmits information obtained by referring to the received grant information.

Upstream bandwidths are dynamically allocated based on the priority of the services (high, medium, and low priority services) in consideration of the characteristics of Ethernet traffics so as to guarantee the quality of service. Such a bandwidth allocation is performed equally for each of the ONUs at predetermined periods.

Figure 2:
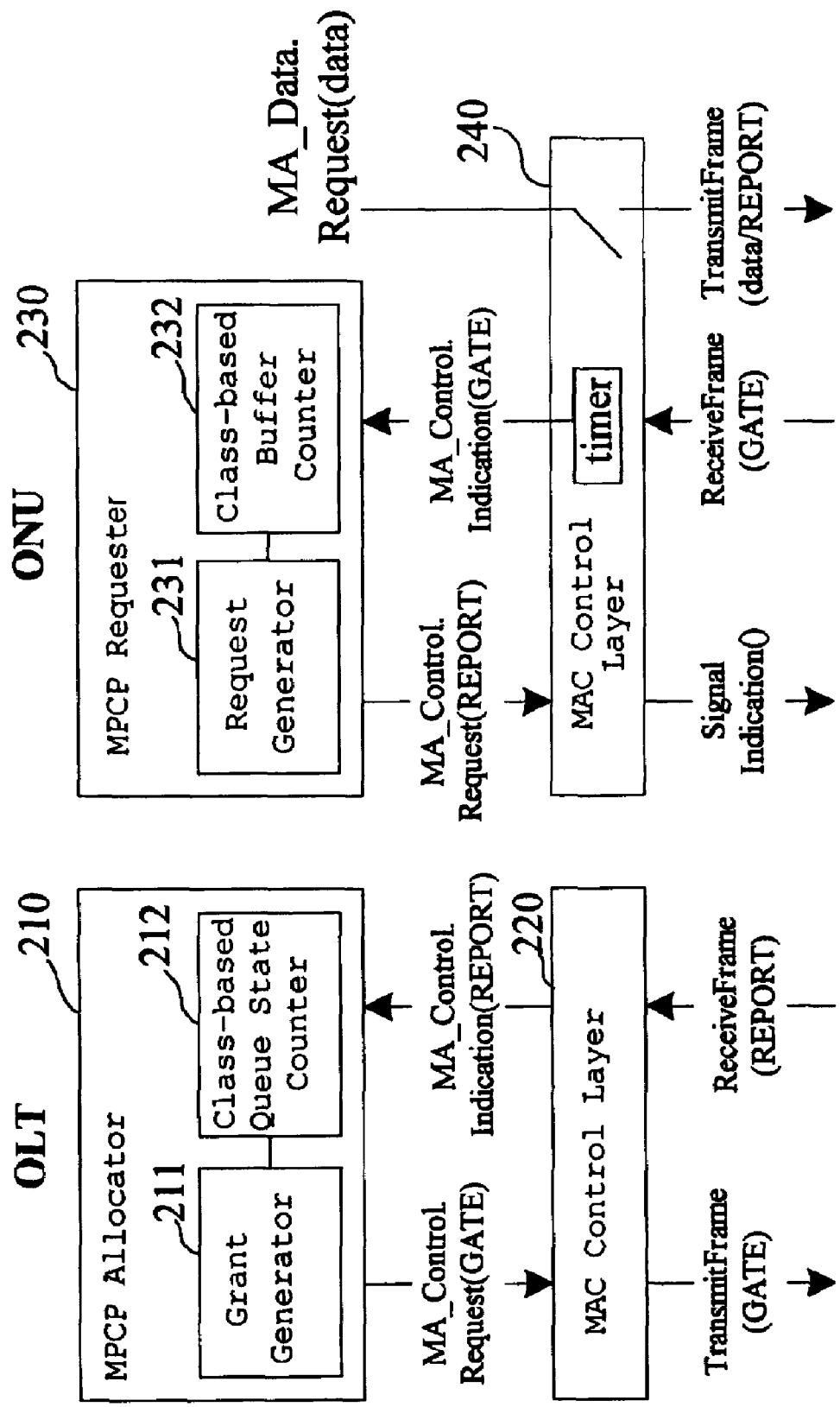
FIG. 2 is a view showing the relationship between an MPCP (Multi-Point Control Protocol) allocator block for performing a dynamic bandwidth allocation and an MPCP requester block for requesting a dynamic bandwidth allocation for an Ethernet passive optical network system according to the present invention.

FIG. 2 shows the relationship between an MPCP (Multi-Point Control Protocol) allocator 210 and an MPCP requester 230. The MPCP allocator 210 performs a dynamic bandwidth allocation algorithm at the OLT. The MPCP requester 230 reports on class-based buffer states to assist the dynamic bandwidth allocation.

When the MPCP allocator 210 receives the upstream report control message from an MAC (Media Access Control) control layer 220, a class-based queue state counter 212 differentiates the ONUs and obtains information on class-based queue lengths in the ONUs. When information on queue states of every ONUs is obtained, a grant generator 211 generates a service-based bandwidth for each of the ONUs, and transmits a control message for upstream bandwidth allocation (GATE) to each of the ONUs.

The MPCP requester 230 receives the upstream bandwidth allocation control message (GATE) from an MAC control layer 240. The MPCP requester 230 counts class-based buffer lengths of the ONUs through a class-based buffer, and generates information on class-based buffer lengths in the ONUs through a requester generator 231. This generated information is transmitted in the format of upstream report control message to the MAC control layer 240.

Figure 3:
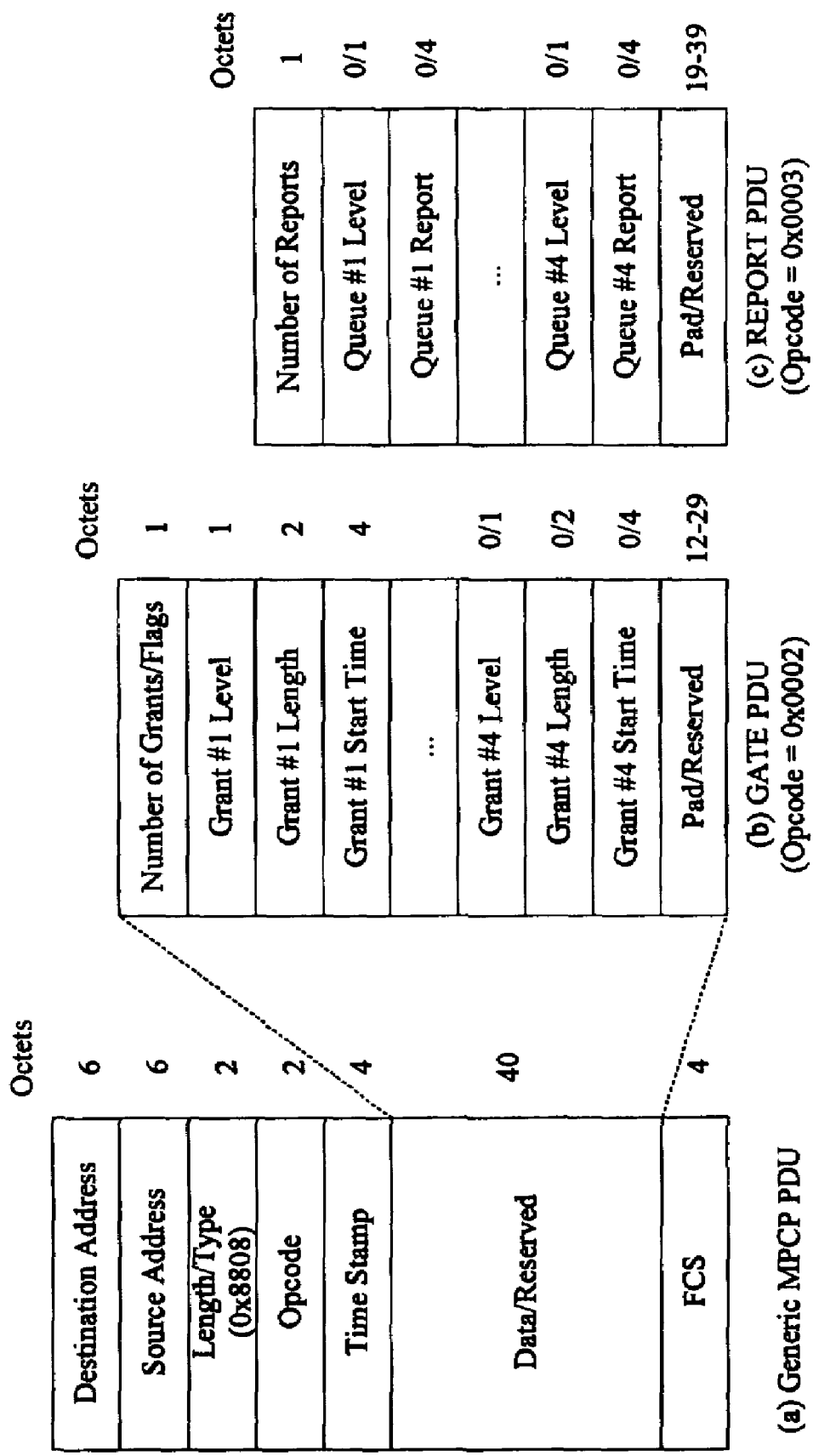
FIG. 3 is a view showing the structure of upstream and downstream control messages defined in the present invention.

Now, the structure of the upstream and downstream control messages as defined in the present invention is described in detail. FIG. 3a shows a general Protocol Data Unit (hereinafter, referred to as "PDU") of the MPCP protocol, which is defined in the IEEE802.3ah EFM (Ethernet First Mile) standardization consortium. FIG. 3b shows a proposed GATE PDU of the upstream bandwidth allocation control message (GATE), and FIG. 3c shows a proposed REPORT PDU of the upstream report control message (REPORT).

As shown in FIG. 3b, the GATE message PDU includes grant level, grant length, and start time of a granted timeslot of upstream bandwidth. The ONUs have different numbers of timeslots, and the addition of the grant level information enables service-based upstream bandwidth allocation in the ONUs, thereby guaranteeing the QoS. As shown in the REPORT message PDU of FIG. 3c, length information in class-based queues is combined together and then reported to the OLT to be included in the calculation of the class-based bandwidth allocation algorithm. The upstream report control message includes information of queue level and queue report (or queue length).

Figure 4A:
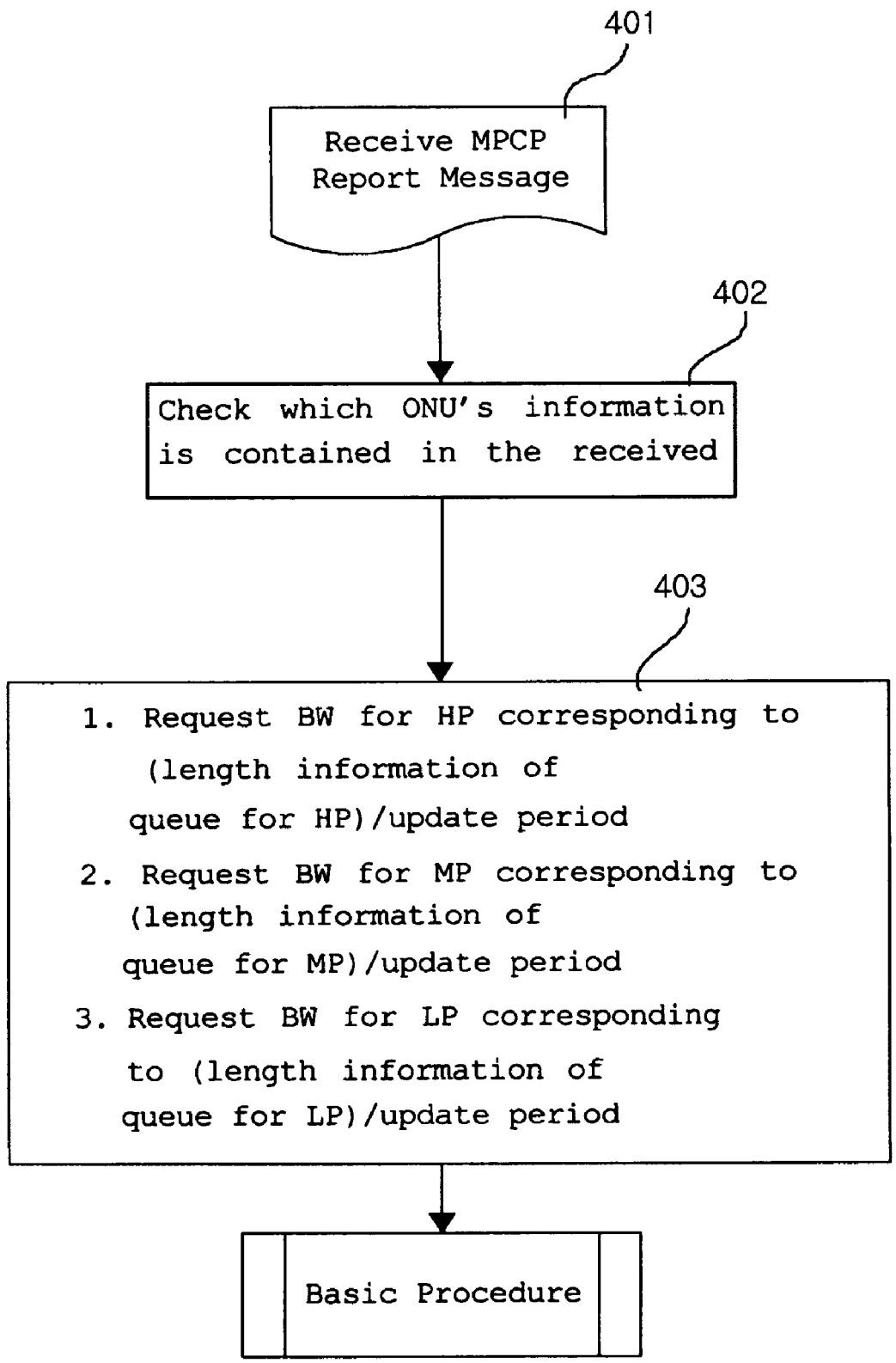
FIGS. 4a and 4b are flowcharts showing the procedure of a dynamic bandwidth allocation method for the Ethernet passive optical network system according to the present invention.

FIG. 4a is a flowchart showing the procedure to be performed before a basic procedure in the dynamic bandwidth allocation method on the Ethernet passive optical network according to the present invention, in the case where state information is received from an ONU.

Figure 4B:
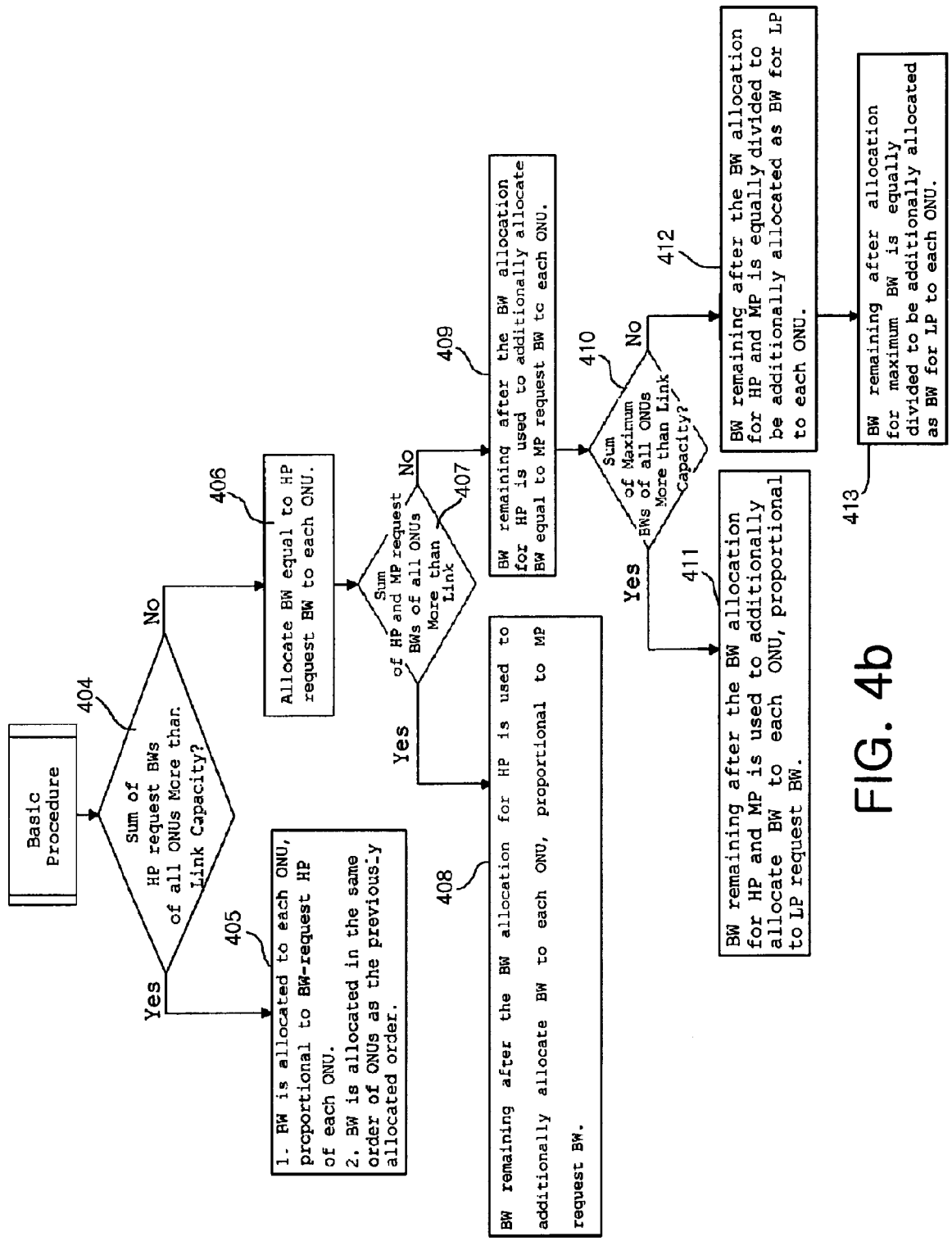

First, when an MPCP report message is received in step (401), it is checked in step (402) which ONU's state information is contained in the received message. Thereafter, request bandwidths for high priority (HP), medium priority (MP), and low priority (LP) are updated in step (403). In detail, a request bandwidth for HP, which corresponds to queue length information for HP/update period, is updated, and a request bandwidth for MP, which corresponds to queue length information for MP/update period, is updated, and a request bandwidth for LP, which corresponds to queue length information for LP/update period, is further updated. Thereafter, the basic procedure as shown in FIG. 4b is performed as follows.

First, the sum of bandwidths for HP of all ONUs is compared with the link capacity in step (404). If the sum of the bandwidths for HP is more than the link capacity, a bandwidth proportional to the bandwidth for HP of each of the ONUs is allocated to each of the corresponding ONUs in the same order of ONUs as the previously allocated order of ONUs in step (405).

When the compared result of step (404) is that the sum of bandwidths for HP of all ONUs is less than the link capacity, a bandwidth equal to the bandwidth for HP is allocated to each of the ONUs in step (406).

Thereafter, the sum of bandwidths for HP and MP of all ONUs is compared with the link capacity in step (407). If the sum of the bandwidths for HP and MP is more than the link capacity, a bandwidth remaining after the allocation for the bandwidths for HP is used to additionally allocate a bandwidth proportional to the bandwidth for MP of each of the ONUs to each of the corresponding ONUs in step (408). On the other hand, when the compared result in step (407) is that the sum of bandwidths for HP and MP is less than the link capacity, a bandwidth remaining after the allocation for the bandwidths for HP is used to additionally allocate a bandwidth equal to the bandwidth for MP of each of the ONUs to each of the ONUs in step (409).

Thereafter, the sum of maximum bandwidths of all ONUs is compared with the link capacity in step (410). If the sum of the maximum bandwidths is more than the link capacity, a bandwidth remaining after the allocation for the bandwidths for HP and MP is used to additionally allocate a bandwidth proportional to the bandwidth for LP of each of the ONUs to the corresponding ONUs in step (411). On the other hand, when the compared result in step (410) is that the sum of the maximum bandwidths is less than the link capacity, an additional bandwidth is allocated to each of the ONUs so that the total bandwidth allocated to each of the ONUs is equal to the maximum bandwidth of each of the ONUs in step (412), and a bandwidth remaining after the bandwidth allocation for the maximum bandwidth is equally divided to be additionally allocated as a bandwidth for LP to each of the ONUs in step (413).

As apparent from the above description, the present invention provides a dynamic bandwidth allocation method in an EPON for access to an optical subscriber network, whereby the QoS is guaranteed and the utilization ratio of the upstream transmission channels is increased while achieving efficient transmission. In addition, the present invention enables the provision of various multimedia services, and also has an economic advantage in that users can share expensive optical resources efficiently and economically.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A dynamic bandwidth allocation method for an Ethernet Passive Optical Network (EPON) including an optical line termination (OLT), an optical distribution network (ODN), and a plurality of optical network units (ONU), the method comprising:

a first step of, upon receipt of a control message for upstream report from the optical network unit, checking which ONU's information is contained in the received control message, and updating a bandwidth;

a second step of, when a sum of bandwidths for HP (High Priority) of all ONUs is more than a link capacity, allocating a bandwidth proportional to the bandwidth for HP of each of the ONUs to each of the ONUs in the same order as a previously allocated order of ONUs, if there is a previously allocated order of ONUs;

a third step of, when the sum of bandwidths for HP (High Priority) of all ONUs is less than the link capacity, allocating a bandwidth equal to the bandwidth for HP to each of the ONUs;

a fourth step of, when a sum of the bandwidths for HP and MP (Medium Priority) of all ONUs is more than the link capacity, using a bandwidth remaining after the allocation for the bandwidths for HP to additionally allocate a bandwidth proportional to the bandwidth for MP of each of the ONUs to each of the ONUs;

a fifth step of, when the sum of the bandwidths for HP and MP of all ONUs is less than the link capacity, using a bandwidth remaining after the allocation for the bandwidths for HP to additionally allocate a bandwidth equal to the bandwidth for MP of each of the ONUs to each of the ONUs;

a sixth step of, when a sum of maximum bandwidths of all ONUs is more than the link capacity, using a bandwidth remaining after the allocation for the bandwidths for HP and MP to additionally allocate a bandwidth proportional to the bandwidth for LP (Low Priority) of each of the ONUs to each of the ONUs; and a seventh step of, when the sum of the maximum bandwidths is less than the link capacity, allocating an additional bandwidth to each of the ONUs so that a total bandwidth allocated to each of the ONUs is equal to the maximum bandwidth of each of the ONUs, and equally dividing a bandwidth remaining after the bandwidth allocation for the maximum bandwidth to be additionally allocated as a bandwidth for LP to each of the ONUs.

2. The dynamic bandwidth allocation method as set forth in claim 1, wherein the first step is performed in such a manner that, when the control message for upstream report is received from the optical network unit, it is checked which ONU's information is contained in the received control message, and a request bandwidth for HP, which corresponds to queue length information for HP/update period, is updated, and a request bandwidth for MP, which corresponds to queue length information for MP/update period, is updated, and a request bandwidth for LP, which corresponds to queue length information for LP/update period, is further updated.

3. The dynamic bandwidth allocation method as set forth in claim 1, wherein
the high priority service is a service having requirements of end-to-end delay and jitter of the services of the ONUs,
the medium priority service is a service which is sensitive to the delay but requires a predetermined bandwidth, and
the low priority service is a BETC (Best Effort Traffic Class) service which has no requirement of end-to-end delay and jitter, and is assigned a marginal bandwidth.

4. A computer-readable medium for storing instructions, which when executed enables a computer to perform:

a first step of, upon receipt of a control message for upstream report, checking which of a plurality of ONU's information is contained in the received control message, and updating a bandwidth;

a second step of, when a sum of bandwidths for HP (high priority) of all ONUs is more than a link capacity, allocating a bandwidth proportional to the bandwidth for HP of each of the ONUs to each of the ONUs in the same order as a previously allocated order of ONUs, if there is a previously allocated order of ONUs;

a third step of, when the sum of bandwidths for HP of all ONUs is less than the link capacity, allocating a bandwidth equal to the bandwidth for HP to each of the ONUs;

a fourth step of, when a sum of the bandwidths for HP and MP (medium priority) of all ONUs is more than the link capacity, using a bandwidth remaining after the allocation for the bandwidths for HP to additionally allocate a bandwidth proportional to the bandwidth for MP of each of the ONUs to each of the ONUs;

a fifth step of, when the sum of the bandwidths for HP and MP of all ONUs is less than the link capacity, using a bandwidth remaining after the allocation for the bandwidths for HP to additionally allocate a bandwidth equal to the bandwidth for MP of each of the ONUs to each of the ONUs;

a sixth step of, when a sum of maximum bandwidths of all ONUs is more than the link capacity, using a bandwidth remaining after the allocation for the bandwidths for HP and MP to additionally allocate a bandwidth proportional to the bandwidth for LP (low priority) of each of the ONUs to each of the ONUs; and a seventh step of, when the sum of the maximum bandwidths is less than the link capacity, allocating an additional bandwidth to each of the ONUs so that a total bandwidth allocated to each of the ONUs is equal to the maximum bandwidth of each of the ONUs, and equally dividing a bandwidth remaining after the bandwidth allocation for the maximum bandwidth to be additionally allocated as a bandwidth for LP to each of the ONUs.

* * * * *